United States Patent
Fukui et al.

(10) Patent No.: US 11,167,624 B2
(45) Date of Patent: Nov. 9, 2021

(54) BACK DOOR HANDLE DEVICE AND METHOD FOR MANUFACTURING SAME

(71) Applicant: TOYODA GOSEI CO., LTD., Kiyosu (JP)

(72) Inventors: Hirotaka Fukui, Kiyosu (JP); Koji Tatematsu, Kiyosu (JP)

(73) Assignee: TOYODA GOSEI CO., LTD., Kiyosu (JP)

( * ) Notice: Subject to any disclaimer, the term of this patent is extended or adjusted under 35 U.S.C. 154(b) by 266 days.

(21) Appl. No.: 16/444,915

(22) Filed: Jun. 18, 2019

(65) Prior Publication Data

US 2020/0031209 A1    Jan. 30, 2020

(30) Foreign Application Priority Data

Jul. 30, 2018 (JP) .............................. JP2018-142612

(51) Int. Cl.
*B60J 5/10* (2006.01)
*E05B 83/18* (2014.01)
*E05B 81/76* (2014.01)

(52) U.S. Cl.
CPC .............. *B60J 5/107* (2013.01); *B60J 5/102* (2013.01); *E05B 81/76* (2013.01); *E05B 83/18* (2013.01)

(58) Field of Classification Search
CPC . B60J 5/107; B60J 5/102; E05B 81/76; E05B 83/18
See application file for complete search history.

(56) References Cited

U.S. PATENT DOCUMENTS

| 8,220,855 B2* | 7/2012 | Nakamura | E05B 83/16 |
| | | | 296/56 |
| 2003/0168881 A1 | 9/2003 | Lesueur et al. | |
| 2003/0173796 A1* | 9/2003 | Harima | B60J 5/101 |
| | | | 296/146.7 |

FOREIGN PATENT DOCUMENTS

| CN | 1267070 A | 9/2000 |
| CN | 203103175 U | 7/2013 |
| EP | 1 037 224 B1 | 5/2005 |
| JP | 2004-502058 A | 1/2004 |

OTHER PUBLICATIONS

Chinese Office Action, dated Sep. 24, 2020, in Chinese Application No. 201910620279.6 and English Translation thereof.

* cited by examiner

*Primary Examiner* — Joseph D. Pape
(74) *Attorney, Agent, or Firm* — McGinn I.P. Law Group, PLLC.

(57) ABSTRACT

A back door handle device includes a switch to output a signal for unlocking or locking the back door, a switch knob to supplement actuating force of the switch, a housing for receiving the switch and the switch knob, and an outer cover that covers the housing. The switch knob includes an operating portion that is moved from an initial position to a switch position, a spring section that, when the operating portion is moved from the initial position toward the switch position, is elastically deformed to produce elastic force in such a direction as to return the operating portion to the initial position, and a temporary fixing portion that prevents such movement of the switch knob that the operating portion is moved from the initial position to the opposite side to the switch position. The signal is output from the switch when the operating portion reaches the switch position.

19 Claims, 9 Drawing Sheets

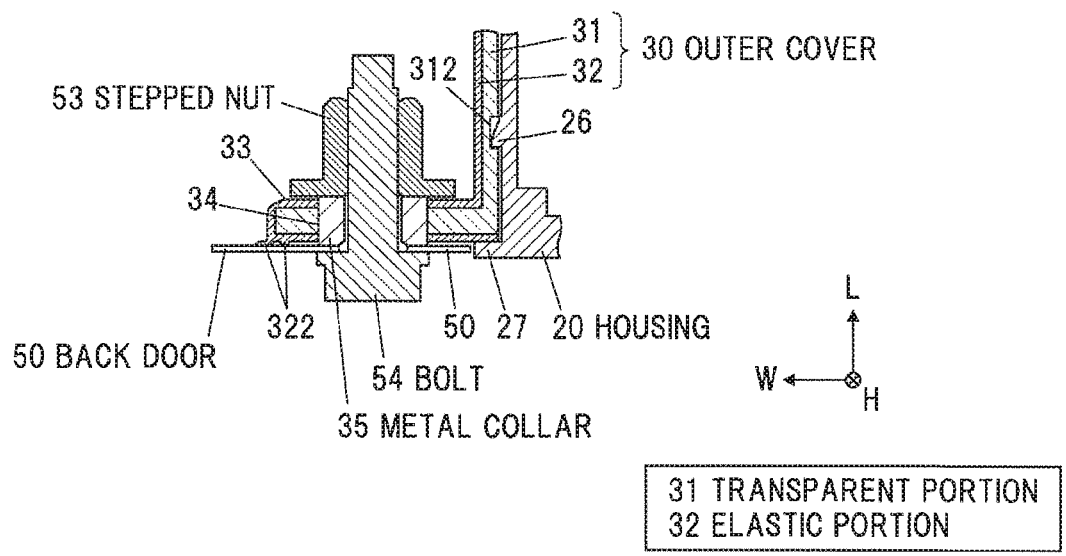
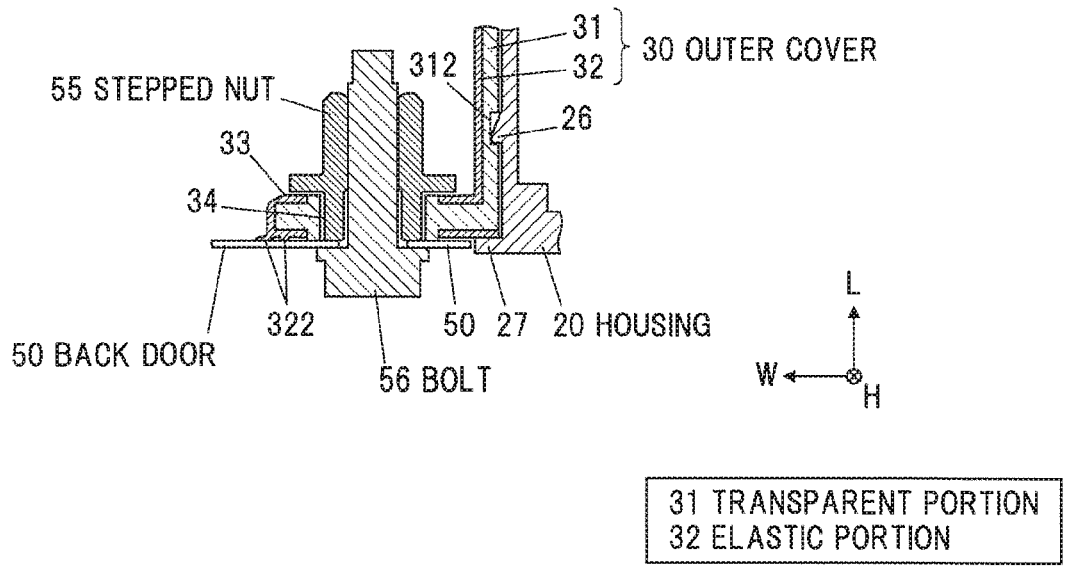

BACK DOOR HANDLE DEVICE AND METHOD FOR MANUFACTURING SAME

BACKGROUND OF THE INVENTION

1. Field of the Invention

The present invention relates to a back door handle device and a method for manufacturing the same.

2. Description of the Related Art

Conventionally, a back door handle device is known, which is installed on a back door of a vehicle, and which is provided with a switch to output a signal for unlocking or locking the back door, and a switch knob to supplement the actuating force of that switch (see patent document 1, for example).

In the back door handle device described in Patent Document 1, by using the switch knob to supplement the actuating force of the switch, even when using the small-size push switch, it is possible to obtain a moderate operation load and a click feeling.

[Patent Document 1] JP-A-2004-502058

SUMMARY OF THE INVENTION

However, in the back door handle device described in Patent Document 1, until a housing with the switch and the switch knob accommodated therein is assembled to an outer cover, the switch knob is not fixed within the housing, so the positional misalignment of the switch knob may occur before the housing is assembled to the outer cover. Moreover, since the switch knob is partially protruded outward from the housing, when the housing is assembled to the outer cover, there may also occur the disruption of the assembling due to contact of the switch knob with the outer cover.

One object of the present invention is to provide a back door handle device having a structure capable of preventing the positional misalignment of a switch knob, and the disruption of assembling due to contact of the switch knob with an outer cover, and a method for manufacturing a back door handle device capable of preventing the positional misalignment of a switch knob, and the disruption of assembling due to contact of the switch knob with an outer cover.

One aspect of the present invention provides the following back door handle devices [1] to [4], and methods [5] to [7] for manufacturing a back door handle device, to achieve the above object.

[1] A back door handle device, comprising: a housing for accommodating a switch and a switch knob; and an outer cover that covers an exterior of the housing; wherein the switch knob is held at an initial position, at least when the housing is assembled with the outer cover.

[2] The back door handle device according to [1], wherein the back door handle device, is installed on a back door of a vehicle and which has a handle switch function for unlocking or locking the back door, wherein: the switch is to output a signal for unlocking or locking the back door; the switch knob is to supplement an actuating force of the switch; the housing is for receiving the switch and the switch knob; and the outer cover covers an exterior of the housing, wherein the switch knob includes: an operating portion that is moved from the initial position to a switch position by a force being applied by its operator; a spring section that, when the operating portion is moved from the initial position toward the switch position, is elastically deformed to produce an elastic force in such a direction as to return the operating portion to the initial position; and a temporary fixing portion prevents such a movement of the switch knob that the operating portion is moved from the initial position to the opposite side to the switch position; and wherein the signal is output from the switch when the operating portion reaches the switch position.

[3] The back door handle device according to [2], wherein when the operating portion is in the initial position, the elastic force is produced in the spring section.

[4] The back door handle device according to [2] or [3], wherein the temporary fixing portion is configured as a rod-like member having a claw at its tip, so that such a movement of the switch knob that the operating portion is moved from the initial position to the opposite side to the switch position is prevented by hooking the claw on the housing or a substrate mounted with the switch thereon.

[5] A method for manufacturing a back door handle device which is installed on a back door of a vehicle and which has a handle switch function for unlocking or locking the back door, the method including the step of assembling a housing for accommodating a switch to output a signal for unlocking or locking the back door and a switch knob to supplement an actuating force of the switch to an outer cover which covers an exterior of the housing, wherein the switch knob includes: an operating portion that is moved from an initial position to a switch position by a force being applied by its operator to operate the switch to output the signal; a spring section that, when the operating portion is moved from the initial position toward the switch position, is elastically deformed to produce an elastic force in such a direction as to return the operating portion to the initial position; and a temporary fixing portion that prevents such a movement of the switch knob that the operating portion is moved from the initial position to the opposite side to the switch position, wherein the assembling step includes temporarily fixing the switch knob within the housing with the temporary fixing portion, to thereby prevent positional misalignment of the switch knob and disruption of the assembling due to contact of the switch knob with the outer cover.

[6] The method according to [5], wherein, in the assembling step, the switch knob is temporarily fixed within the housing with the elastic force being produced in the spring section.

[7] The method according to claim [5] or [6], wherein the temporary fixing portion is configured as a rod-like member having a claw at its tip, so that such a movement of the switch knob that the operating portion is moved from the initial position to the opposite side to the switch position is prevented by hooking the claw on the housing or a substrate mounted with the switch thereon.

Points of the Invention

According to the present invention, it is possible to provide the back door handle device having a structure capable of preventing the positional misalignment of the switch knob, and the disruption of assembling due to contact of the switch knob with the outer cover, and the method for manufacturing the back door handle device capable of preventing the positional misalignment of the switch knob, and the disruption of assembling due to contact of the switch knob with the outer cover.

BRIEF DESCRIPTION OF THE DRAWINGS

FIGS. 5A and 5B are enlarged cross-sectional views around an attaching portion of the back door handle device attached to the back door;

DETAILED DESCRIPTION OF THE PREFERRED EMBODIMENTS

Embodiment

Hereinafter, an embodiment of the present invention will be described in conjunction with the attached drawings. Directions W, L and H shown in each drawing indicate a width direction of a back door handle device 1, a length direction of the back door handle device 1, and a height direction of the back door handle device 1, respectively. The positive and negative in the W direction, L direction, and H direction in each drawing are common.

(Whole Configuration of the Back Door Handle Device)

Figure 1:
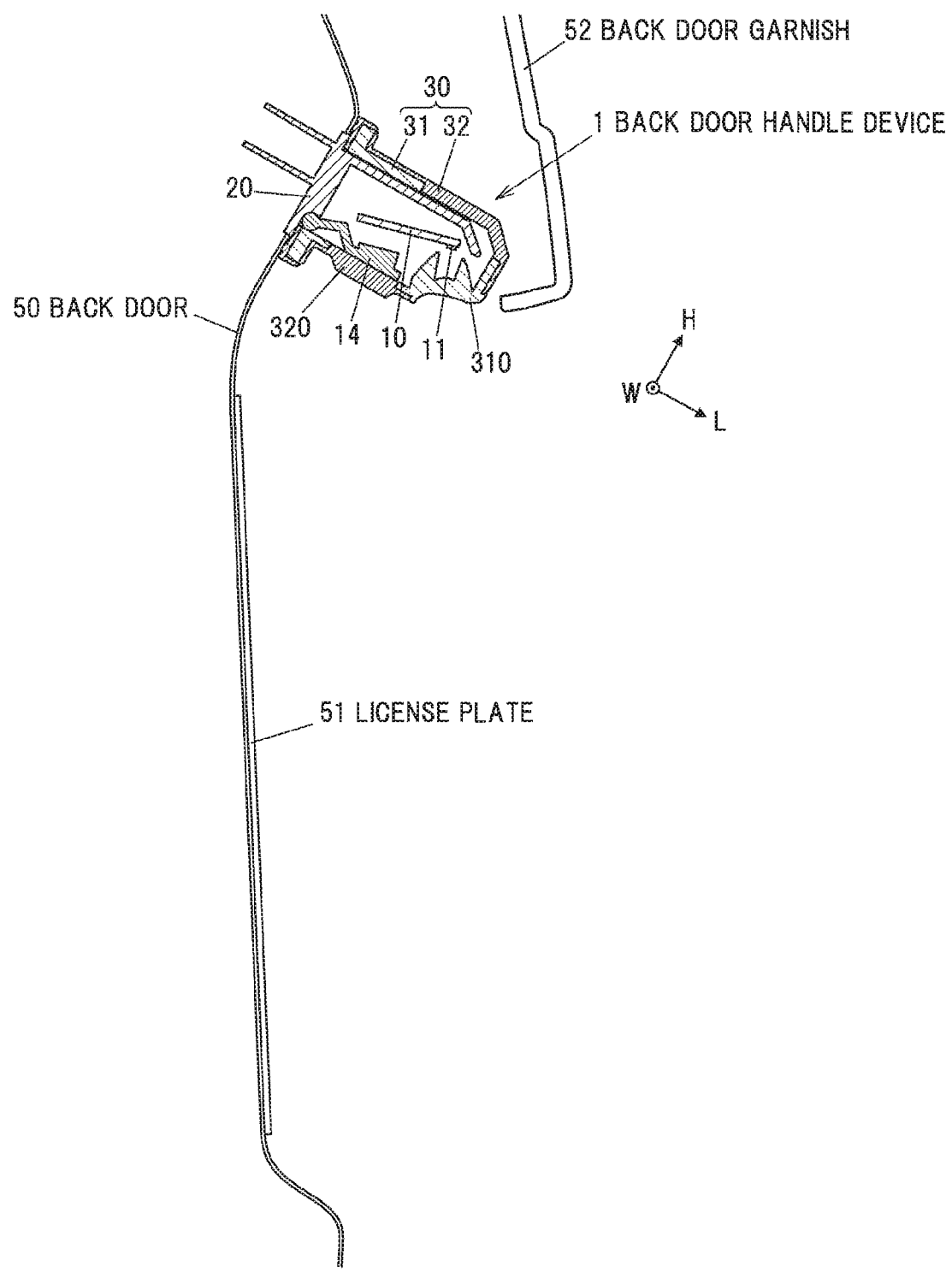
FIG. 1 is a vertical sectional view of a back door on which is installed a back door handle device according to an embodiment of the present invention.

FIG. 1 is a vertical cross-sectional view of a back door 50 on which is installed the back door handle device 1 according to the embodiment of the present invention.

The back door 50 is a door provided on the rear surface of a vehicle such as an automobile and is also called a rear hatch or a tail gate. A license plate 51 is attached to the back door 50.

A back door garnish 52 is attached above the license plate 51 of the back door 50, and on an inner side of the back door garnish 52 (in a space between the back door 50 and the back door garnish 52), a back door handle device 1 is installed that serves as a license lamp for applying light to the license plate 51 and a handle switch for opening and closing the back door 50.

Figure 2A:
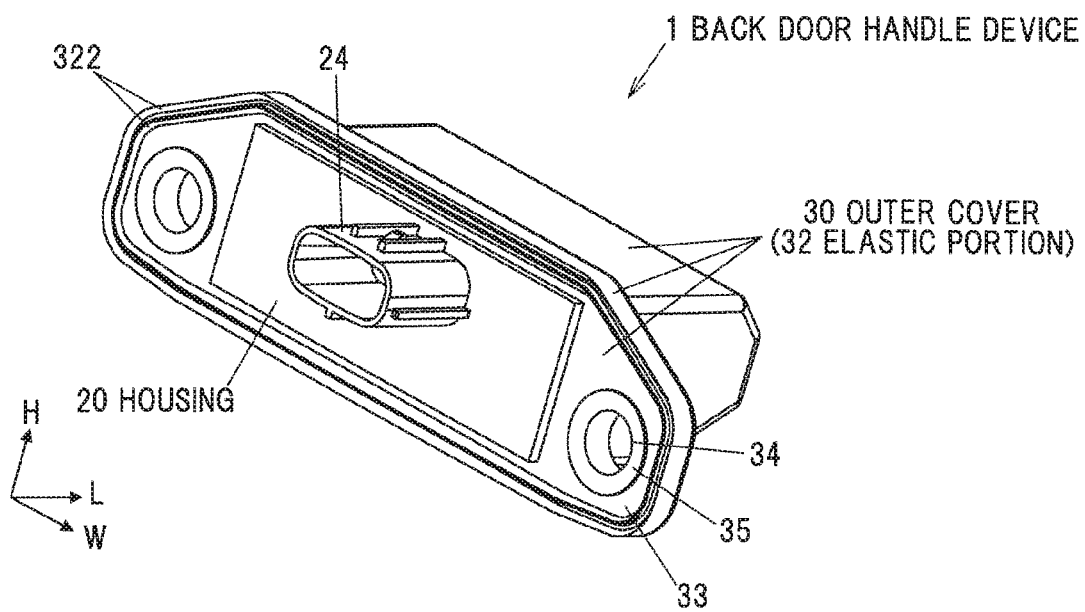
FIGS. 2A and 2B are perspective views of the back door handle device according to the embodiment of the present invention.
Figure 2B:
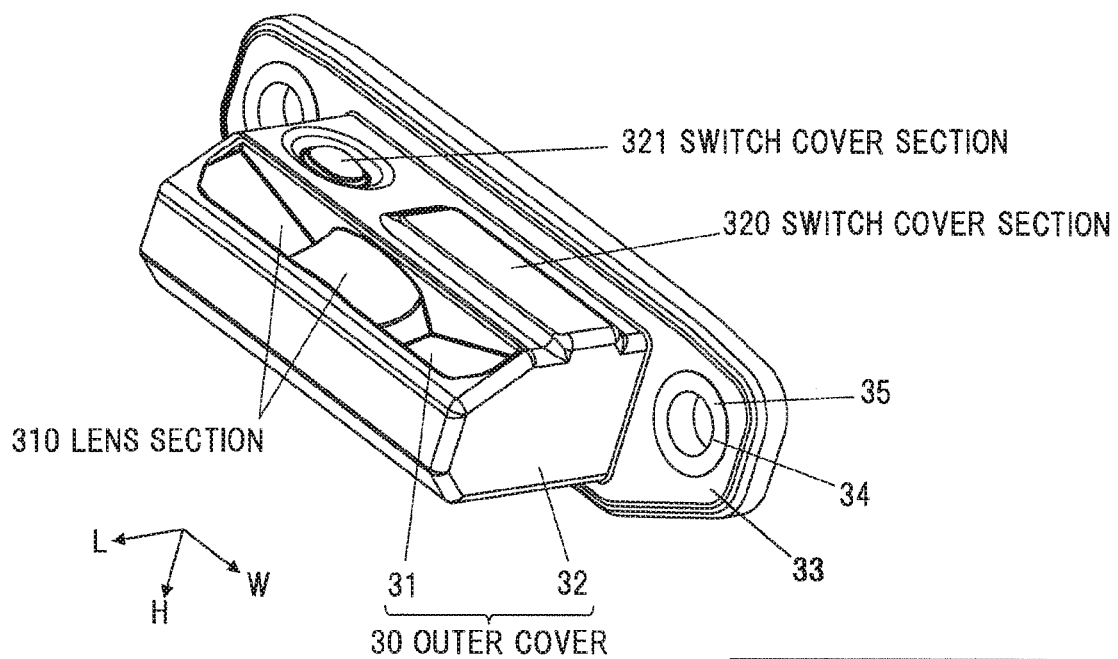

FIGS. 2A and 2B are perspective views of the back door handle device 1 according to the embodiment of the present invention. FIG. 2A is the perspective view of the back door handle device 1 when viewed from the front upper side of the vehicle, and FIG. 2B is the perspective view of the back door handle device 1 when viewed from the rear lower side of the vehicle.

Figure 3:
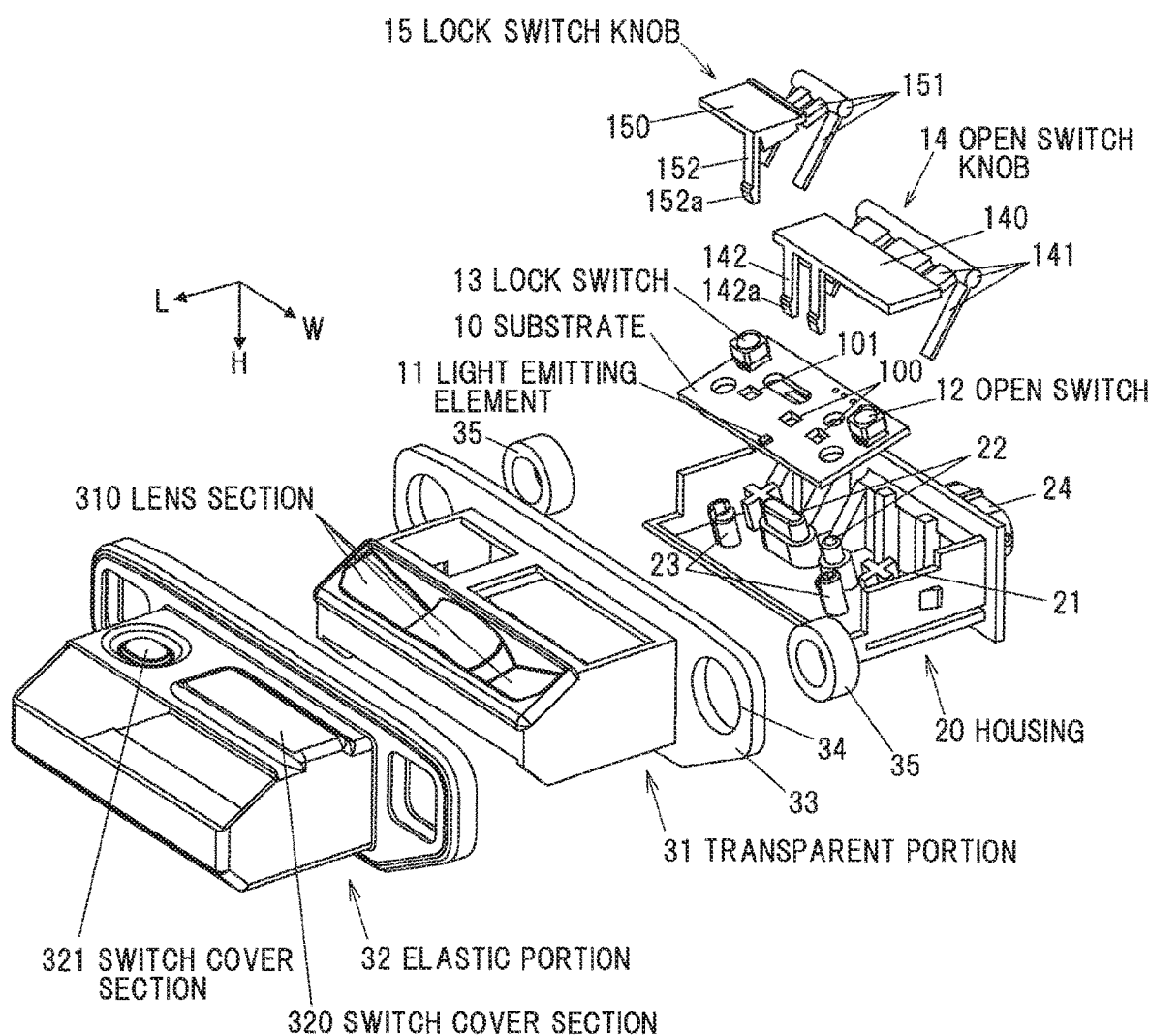
FIG. 3 is an exploded perspective view of the back door handle device according to the embodiment of the present invention.

FIG. 3 is an exploded perspective view of the back door handle device 1 according to the embodiment of the present invention.

The back door handle device 1 includes a light emitting element 11 as a light source of the license lamp, an open switch 12 to output a signal for unlocking the back door 50, a lock switch 13 to output a signal for locking the back door 50, a substrate 10 on which the light emitting element 11, the open switch 12, and the lock switch 13 are mounted, an open switch knob 14 to supplement an actuating force (a repulsive force to an external force for pushing the switch) of the open switch 12, a lock switch knob 15 to supplement an actuating force of the lock switch 13, a housing 20 for accommodating the substrate 10, the light emitting element 11, the open switch 12, the lock switch 13, the open switch knob 14, and the lock switch knob 15, and an outer cover 30 for covering an exterior of the housing 20.

The substrate 10 is a wiring substrate having a wiring which is connected to the electrodes of the light emitting element 11, the open switch 12, and the lock switch 13. The light emitting element 11, the open switch 12, and the lock switch 13 may be separately mounted on a plurality of the substrates, but for the purpose of a reduction in size of the back door handle device 1, and a reduction in the number of parts to reduce cost, and the number of assembling steps, it is preferable to install them on the same substrate 10.

It is preferable to arrange the light emitting element 11 on the rear side of the vehicle relative to the open switch 12 and the lock switch 13. This makes it possible to overlap locations in the vehicle width of a lens section 310 to be described later, which acts as a light extraction portion of the back door handle device 1, and a switch cover section 320 and a switch cover section 321 to be described later, which act as operating portions for the handle switch for opening and closing the back door, and therefore makes it easy to specify the locations of the operating parts for the handle switch using the light as a guide.

In addition, since the light emitting element 11 is disposed on the rear side of the vehicle, when installing a camera within the back door garnish 52, it is possible to narrow a light shielding range in which the light emitted from the back door handle device 1 is shielded by the camera, and it is therefore possible to arrange the camera closer to the back door handle device 1. That is, it is possible to arrange the camera closer to the highly visually recognizable middle in the vehicle width direction of the back door 50.

Note that although not shown, a cable with a connector is connected to the substrate 10, so that the light emitting element 11, the open switch 12, and the lock switch 13, and external devices (a power supply device, an unlocking device, a locking device, etc.) are connected together via that cable with the connector.

The housing 20 has an opening 21 on the lower side of the vehicle for passing therethrough the light emitted from the light emitting element 11, and for operating the open switch 12 and the lock switch 13 from its exterior. The substrate 10, the open switch knob 14 and the lock switch knob 15 are then installed on an inner surface of the vehicle upper side of the housing 20. Also, the housing 20 has a cable port 24 for passing therethrough the cable with the connector connected to the substrate 10.

The outer cover 30 is formed of an integrally molded part by insert molding or the like, which includes a transparent portion 31 made of a material that transmits the light emitted from the light emitting element 11 and an elastic portion 32 made of an elastic material to cover an outer side of the transparent portion 31.

The transparent portion 31 is made of a material having the property of transmitting the light emitted from the light emitting element 11, such as polycarbonate or acrylic. The transparent portion 31 includes, on the vehicle lower side of the outer cover 30, a lens section 310 for extracting the light emitted from the light emitting element 11 while widening its emission range in the vehicle width direction.

An overlapping portion of the elastic section 32, which overlaps the lens section 310, is open to take out the light from the lens section 310.

The outer cover 30 has an attaching portion 33 having an attaching hole 34 for bolt fixing to attach the back door handle device 1 to the back door 50. The attaching portion 33 is provided in a contacting portion of the outer cover 30 which is brought into contact with the back door 50, and is composed of a portion extending in the vehicle width direction from a main body portion of the transparent portion 31 covering the housing 20, and the outer cover 30 covering a surface of that extending portion.

As shown in FIG. 2, it is preferable that the attaching hole 34 has a metal collar 35 fitted therein. Tightening a metallic bolt directly to the attaching portion 33 may cause deformation due to thermal creep. In this case, the occurrence of rattling of the back door handle device 1 attached to the back door 50 may cause abnormal noise, or gap formation between the outer cover 30 and an attaching surface of the back door 50, leading to a lowering in waterproofness to be described later. By using the metal collar 35 to tighten the bolt to the metal collar 35, it is possible to prevent the thermal creep of the attaching portion 33. The metal collar 35 can be molded integrally with the transparent portion 31 and the elastic portion 32 by insert molding or the like.

The elastic portion 32 is made of, for example, a thermoplastic elastomer such as TPE (Thermo Plastic Elastomer). The elastic portion 32 has a switch cover section 320 and a switch cover section 321 on the vehicle lower side of the outer cover 30. The switch cover section 320 refers to a portion to which its operator applies a pushing force from its exterior when unlocking the back door 50, in other words, when operating the open switch 12 to output a signal. The switch cover section 321 is also a portion to which its operator applies a pushing force from its exterior when locking the back door 50, in other words, when operating the lock switch 13 to output a signal.

An overlapping portion of the transparent portion 31 which overlaps the switch cover section 320 and the switch cover section 321 is open to bring the switch cover section 320 and the switch cover section 321 into contact with the open switch 12 and the lock switch 13 respectively.

A contact surface of the outer cover 30 which is brought into contact with the back door 50 is configured as the elastic portion 32. By bringing the elastic portion 32 having elasticity into close contact with the attaching surface of the back door 50, it is possible to prevent the ingress of water into the housing 20.

Further, in order to further enhance the waterproof performance of the outer cover 30, it is preferable that the contact portion of the elastic portion 32 with the attaching surface of the back door 50 is provided with an annular protrusion 322 which surrounds the contact surface of the housing 20 with the back door 50. This protrusion of the elastic portion 32 is pressed against the back door 50 by attaching the back door handle device 1 to the back door 50, collapsed or warped, and strongly brought into close contact with the back door 50. In particular, when the protrusion of the elastic portion 32 is warped to bring its side surface into close contact with the attaching surface of the back door 50, the stronger waterproofness can be obtained.

Since the transparent portion 31 serves as a resin portion and the lens of the outer cover, and the transparent portion 31 and the elastic portion 32 can integrally be formed by insert molding or the like, it is possible to reduce the number of parts of the back door handle device 1 and the number of manufacturing steps, and thereby achieve a lowering in manufacturing cost and a reduction in size.

Note that the outer cover 30 may include a portion made of a material different from the transparent portion 31 and the elastic portion 32, but in order to suppress the manufacturing cost, it is preferable that the outer cover 30 can integrally be molded including the transparent portion 31 and the elastic portion 32.

Figure 4A:
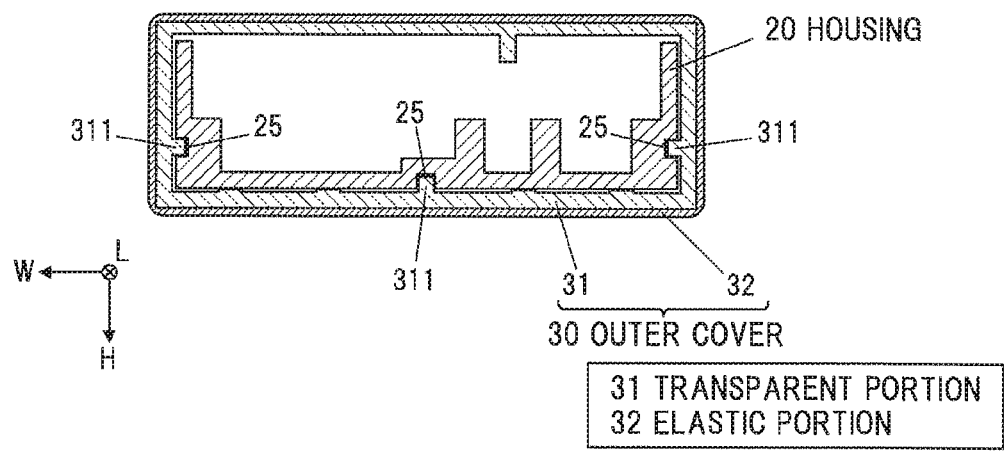
FIGS. 4A and 4B are cross sectional views of a housing and an outer cover.
Figure 4B:
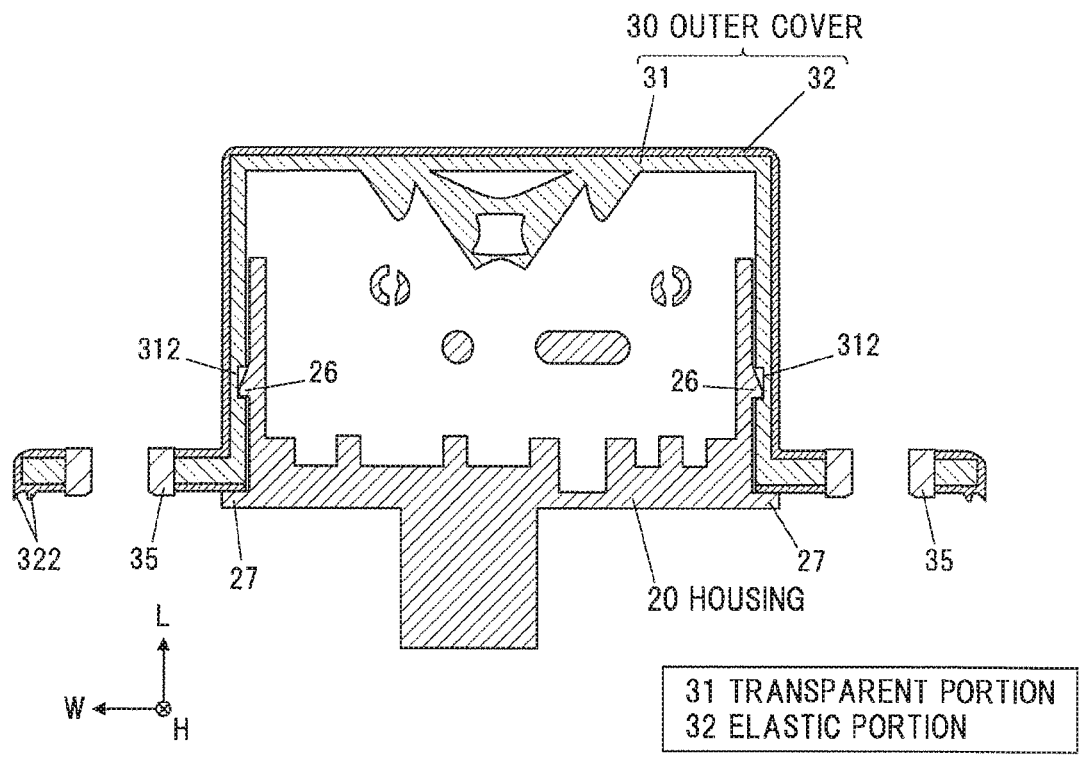

FIGS. 4A and 4B are cross-sectional views of the housing 20 and the outer cover 30. As shown in FIG. 4A, it is preferable that the housing 20 and the transparent portion 31 of the outer cover 30 have recessed portions 25 and protruded portions 311 respectively which are mated to each other.

By providing the recessed portion 25 provided along the length direction (L direction) on a side surface of the housing 20 and the protruded portion 311 mated to the recessed portion 25, when assembling the housing 20 to the outer cover 30, it is possible to perform positioning in the height direction (H direction) of the housing 20. Further, by providing the recessed portion 25 provided along the length direction (L direction) on a bottom surface of the housing 20 and the protruded portion 311 mated to the recessed portion 25, when assembling the housing 20 to the outer cover 30, it is possible to perform positioning in the width direction (W direction) of the housing 20. Furthermore, by providing the protruded portions 311, it is possible to enhance a section modulus of the transparent portion 31 and thereby enhance its rigidity.

Further, as shown in FIG. 4B, it is preferable that the housing 20 and the transparent portion 31 of the outer cover 30 have a claw 26 and a groove 312 respectively for hooking the claw 26. The claw 26 is provided, for example, on the side surface of the housing 20. By providing the claw 26 and the groove 312, when assembling the housing 20 to the outer cover 30, it is possible to perform positioning in the longitudinal direction (L direction) of the housing 20, and also prevent the housing 20 and the outer cover 30 from being separated from each other after assembling.

Further, as shown in FIG. 4B, by providing the housing 20 with a stopper 27 which is hooked on a rim of an opening of the outer cover 30 into which the housing 20 is inserted, it is possible to perform positioning in the length direction (L direction) of the housing 20 when assembling the housing 20 to the outer cover 30.

FIGS. 5A and 5B are enlarged cross-sectional views around the attaching portion 33 of the back door handle device 1 attached to the back door 50.

FIG. 5A shows one example of attachment of the back door handle device 1 when the back door handle device 1 has the metal collar 35. In this case, the metal collar 35 fitted in the attaching hole 34 and the back door 50 are fixed together, with a stepped nut 53 and a bolt 54.

FIG. 5B shows one example of attachment of the back door handle device 1 when the back door handle device 1 has no metal collar 35. In the example shown in FIG. 5B, the outer cover 30 is formed of an integrally molded part of the transparent portion 31 and the elastic portion 32, and the transparent portion 31 adjacent to the attaching hole 34 is not covered by the elastic portion 32, but is brought into contact with the back door 50. It is then preferable that the step nut 55 and the bolt 56 are not brought into contact with the attaching portion 33, but that the back door 50 is fixed therebetween from both its sides. This makes it possible to prevent the deformation of the attaching portion 33 due to the thermal creep, without using the metal collar 35.

When no metal collar 35 is used for the back door handle device 1, there is likely to be no damage to the attaching portion 33 caused by stress produced in a fixing portion where the metal collar 35 and the attaching hole 34 are fixed together. On the other hand, when the stepped nut 55 and the bolt 56 are not brought into contact with the attaching portion 33 as described above, a gap may form between the back door 50 and the attaching portion 33. For this reason, it is important to enhance the waterproofness with the protrusion 322 of the elastic portion 32.

(Configuration Related to the License Lamp Function)

The back door handle device 1 includes, for the purpose of the license lamp function, the light emitting element 11 for emitting light, and the lens section 310 of the transparent portion 31 of the outer cover 30. In the back door handle device 1, the light emitted from the light emitting element 11 is extracted through the lens section 310 to illuminate the number plate 51.

Used as the light emitting element 11 is typically an LED. The LED is a small-sized light emitting element, and is also low in power consumption and amount of heat generation, and long in life, and therefore suitable for use as the light emitting element 11. The lens section 310 is made of a transparent material such as an acrylic resin.

Figure 6:
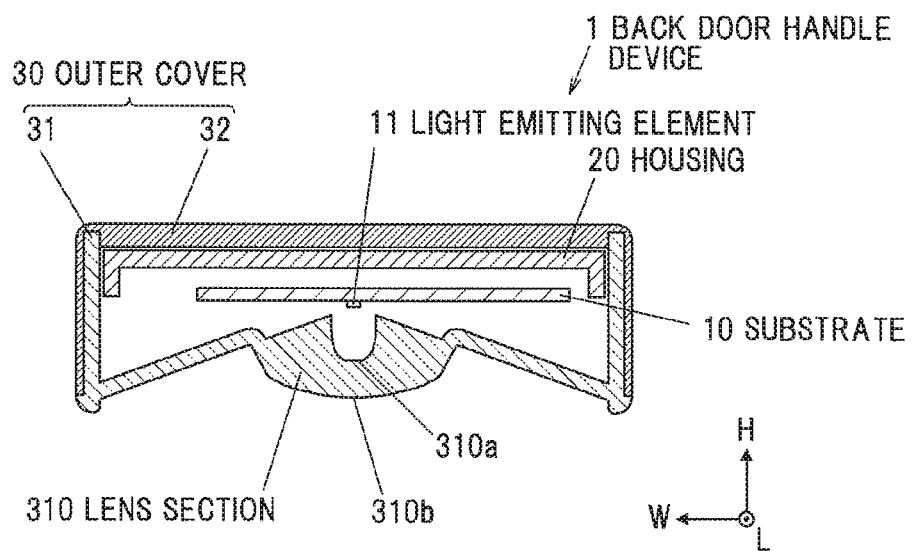
FIG. 6 is a cross-sectional view of the back door handle device including cross sections of a light emitting element and a lens section of the outer cover.

FIG. 6 is a cross-sectional view of the back door handle device 1 including cross sections of the light emitting element 11 and the lens section 310 of the outer cover 30. As shown in FIG. 6, it is preferable that the lens section 310 has a recessed portion 310a, which is provided on an inner surface of the outer cover 30, and a protruded portion 310b, which is provided on an outer surface of the outer cover 30 so as to cover the recessed portion 310a. By refracting the light emitted from the light emitting element 11 at the surfaces of the recessed portion 310a and the protruded portion 310b, it is possible to widen the emission range in the vehicle width direction. Further, by providing the recessed portion 310a and the protruded portion 310b, it is possible to enhance the section modulus of the lens section 310 to enhance the rigidity.

This makes it possible to reduce the number of the light emitting elements 11 required to illuminate the license plate 51 at a desired brightness (brightness satisfying the light distribution law), and thereby reduce the size of the back door handle device 1. The number of the light emitting elements 11 included in the back door handle device 1 may be one.

(Configuration Related to the Handle Switch Function for Back Door Opening and Closing)

Figure 7A:
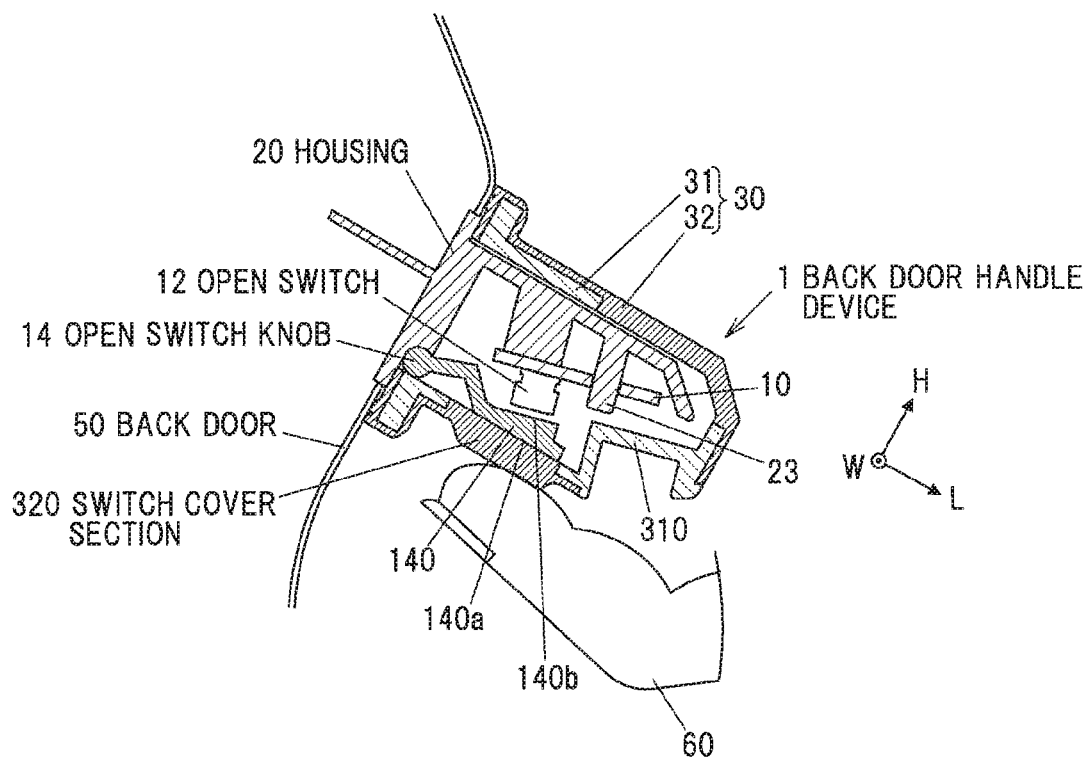
FIGS. 7A and 7B are vertical cross-sectional views of the back door handle device attached to the back door.
Figure 7B:
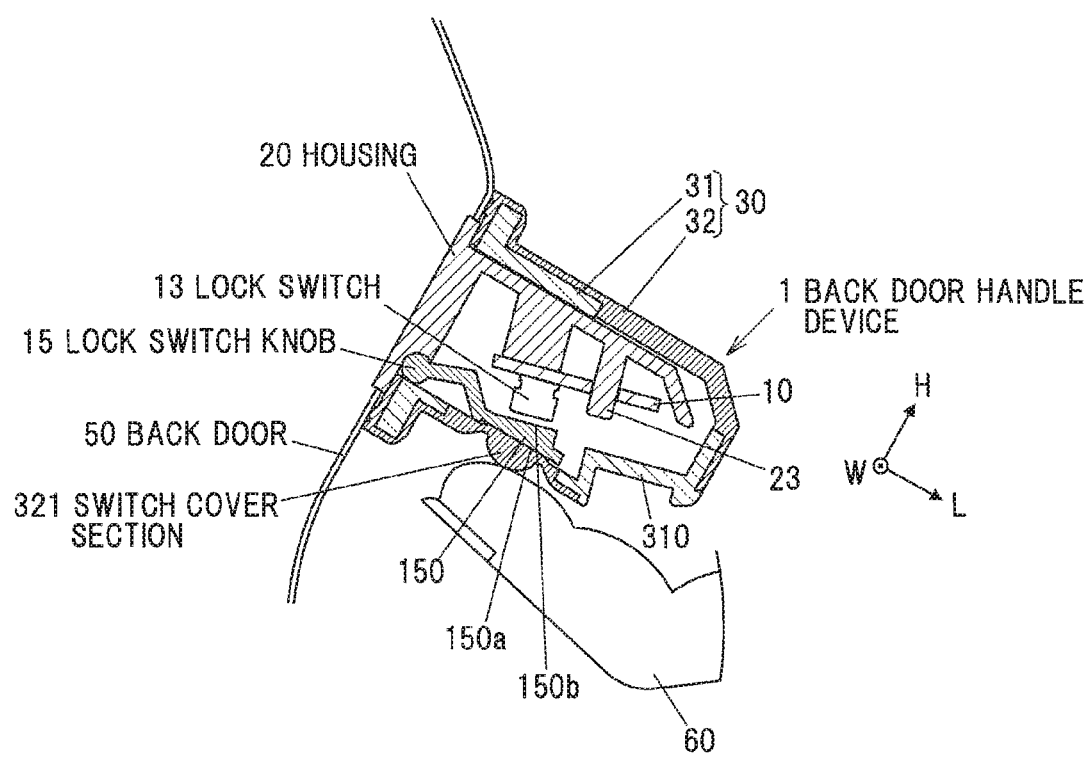

FIGS. 7A and 7B are vertical sectional views of the back door handle device 1 attached to the back door 50. The cross sectional view of FIG. 7A includes the cross sections of the open switch 12 and the open switch knob 14, and the cross sectional view of FIG. 7B includes the cross sections of the lock switch 13 and the lock switch knob 15. No back door garnish 52 is shown in FIGS. 7A and 7B.

The back door handle device 1 has, for the purpose of the handle switch function for opening and closing the back door, the open switch 12 to output a signal for unlocking the back door 50 to an external unlocking device, the lock switch 13 to output a signal for locking the back door 50 to an external locking device, the open switch knob 14 to supplement the actuating force of the open switch 12, the lock switch knob 15 to supplement the actuating force of the lock switch 13, the switch cover section 320 which is touched by its operator's hand 60 when unlocking the back door 50, and the switch cover section 321 which is touched by its operator's hand 60 when locking the back door 50.

The open switch 12 and the lock switch 13 are push switches that, when internal contacts are electrically connected together by pushing, output a contact signal (a signal indicating whether or not the contacts are connected). By inputting the contact signal output from the open switch 12 to the unlocking device, the unlocking device is operated to unlock the back door 50. In addition, by inputting the contact signal output from the open switch 12 to the locking device, the locking device is operated to lock the back door 50. Note that, in the back door handle device 1, instead of the push switches, switches of another type such as an electrostatic switch may be used as the open switch 12 and the lock switch 13.

Figure 8A:
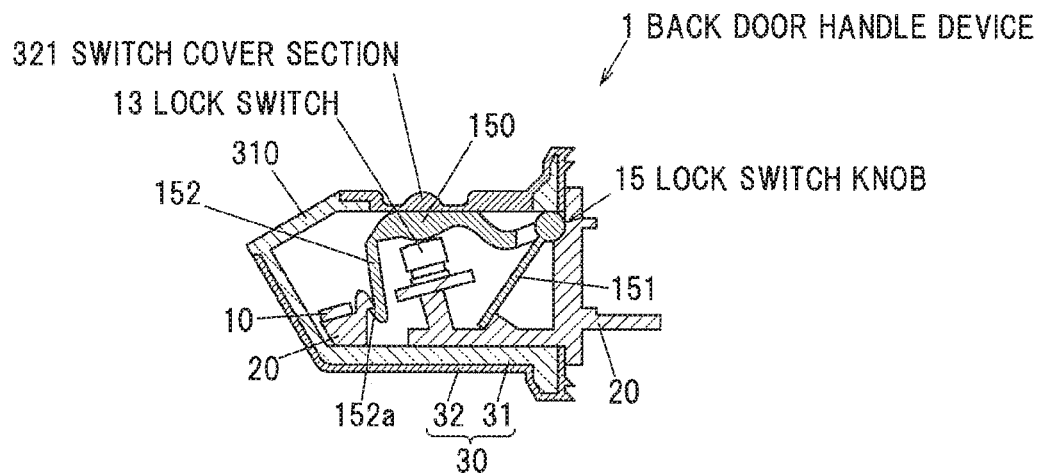
FIGS. 8A and 8B are vertical sectional views showing the back door handle device before and after a lock switch is pushed in by its operator via a switch cover section and a lock switch knob.
Figure 8B:
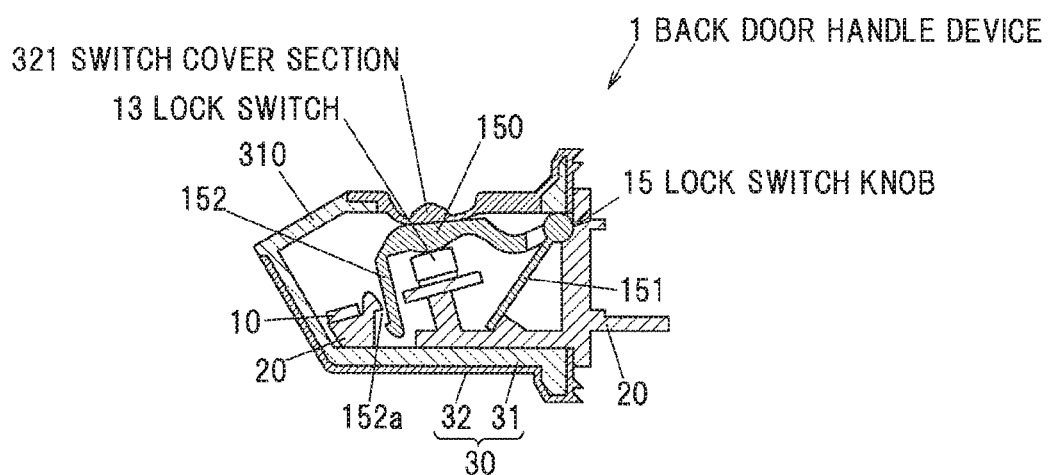

FIGS. 8A and 8B are vertical sectional views showing the back door handle device 1 before and after the lock switch 13 is pushed by its operator via the switch cover section 321 and the lock switch knob 15. The back door handle device 1 before and after the open switch 12 is pushed by its operator via the switch cover section 320 and the open switch knob 14 is similar to that shown in FIGS. 8A and 8B.

The open switch knob 14 includes an operating portion 140, which is moved from an initial position to a switch position by pushing when unlocking the back door 50, a spring section 141, which, when the operating portion 140 is moved from the initial position toward the switch position, is elastically deformed to produce an elastic force in a direction of returning the operating portion 140 to the initial position, and a temporary fixing portion 142 for temporarily fixing the open switch knob 14 within the housing 20 when the housing 20 with the substrate 10, the light emitting element 11, the open switch 12, the lock switch 13, the open switch knob 14, and the lock switch knob 15 accommodated therein is assembled to the outer cover 30.

The operating part 140, the spring section 141, and the temporary fixing part 142 are integrally formed. In other words, the open switch knob 14 is configured as an integral molded part.

When the operator applies a pushing force to the switch cover section 320 of the outer cover 30 from the exterior, and when the operating portion 140 of the open switch knob 14 is moved from the initial position to reach the switch position, the open switch 12 is pushed in by the operating portion 140, to output the contact signal.

The operating portion 140 of the open switch knob 14 is typically plate-shaped, and includes a first surface 140a, which faces the switch cover section 320 side of the outer cover 30, and a second surface 140b, which is configured as an opposite surface to the first surface 140a, and which faces the open switch 12 side. When unlocking the back door 50, the operator presses the switch cover section 320, and then the switch cover section 320 presses the first surface 140a of the operating portion 140, while the second surface 140b of the operating portion 140 presses the open switch 12. When the operating portion 140 is in the initial position, the second surface 140b is in contact with the open switch 12 or is slightly separate from the open switch 12.

The spring section 141 of the open switch knob 14 is in partial contact with the inner surface of the housing 20, so that when unlocking the back door 50, the operator presses the operating portion 140 of the open switch knob 14 via the switch cover section 320, the spring section 141 is pressed against the inner surface of the housing 20 and elastically deformed, to produce in the spring section 141 an elastic force in the direction of returning the operating portion 140 to the initial position. The spring section 141 is integral with the operating portion 140, and is configured as a rod-like member, a plate-like member, or a combination thereof.

By using the open switch knob 14 having the spring section 141 to supplement the actuating force of the open switch 12, even when using the small push switch as the open switch 12, it is possible to obtain a moderate operation load and a click feeling. This makes it possible to achieve both the size reduction of the back door handle device 1 and the appropriate operation load. Note that the elastic force produced in the spring section 141 can appropriately be adjusted according to the shape, material, and the like of the spring section 141. That is, by adjusting the shape, material, and the like of the spring section 141, it is possible to achieve the desired operation load.

The lock switch knob 15 includes an operating portion 150, which is moved from an initial position to a switch position by pushing when locking the back door 50, a spring section 151, which, when the operating portion 150 is moved from the initial position toward the switch position, is elastically deformed to produce an elastic force in a direction of returning the operating portion 150 to the initial position, and a temporary fixing portion 152 for temporarily fixing the lock switch knob 15 within the housing 20 when the housing 20 with the substrate 10, the light emitting element 11, the open switch 12, the lock switch 13, the open switch knob 14, and the lock switch knob 15 accommodated therein is assembled to the outer cover 30.

The operating part 150, the spring section 151, and the temporary fixing part 152 are integrally formed. In other words, the lock switch knob 15 is configured as an integral molded part.

When the operator applies a pushing force to the switch cover section 321 of the outer cover 30 from the exterior, and when the operating portion 150 of the lock switch knob 15 is moved from the initial position to reach the switch position, the lock switch 13 is pushed in by the operating portion 150, to output the contact signal.

The operating portion 150 of the lock switch knob 15 is typically plate-shaped, and includes a first surface 150a, which faces the switch cover section 321 side of the outer cover 30, and a second surface 150b, which is configured as an opposite surface to the first surface 150a, and which faces the lock switch 13 side. When locking the back door 50, the operator presses the switch cover section 321, and then the switch cover section 321 presses the first surface 150a of the operating portion 150, while the second surface 150b of the operating portion 150 presses the lock switch 13. When the operating portion 150 is in the initial position, the second surface 150b is in contact with the lock switch 13 or is slightly separate from the lock switch 13.

The spring section 151 of the lock switch knob 15 is in partial contact with the inner surface of the housing 20, so that when locking the back door 50, the operator presses the operating portion 150 of the lock switch knob 15 via the switch cover section 321, the spring section 151 is pressed against the inner surface of the housing 20 and elastically deformed, to produce in the spring section 151 an elastic force in the direction of returning the operating portion 150 to the initial position. The spring section 151 is integral with the operating portion 150, and is configured as a rod-like member, a plate-like member, or a combination thereof.

By using the lock switch knob 15 having the spring section 151 to supplement the actuating force of the lock switch 13, even when using the small push switch as the lock switch 13, it is possible to obtain a moderate operation load and a click feeling. This makes it possible to achieve both the size reduction of the back door handle device 1 and the appropriate operation load. Note that the elastic force produced in the spring section 151 can appropriately be adjusted according to the shape, material, and the like of the spring section 151. That is, by adjusting the shape, material, and the like of the spring section 151, it is possible to achieve the desired operation load.

Figure 9A:
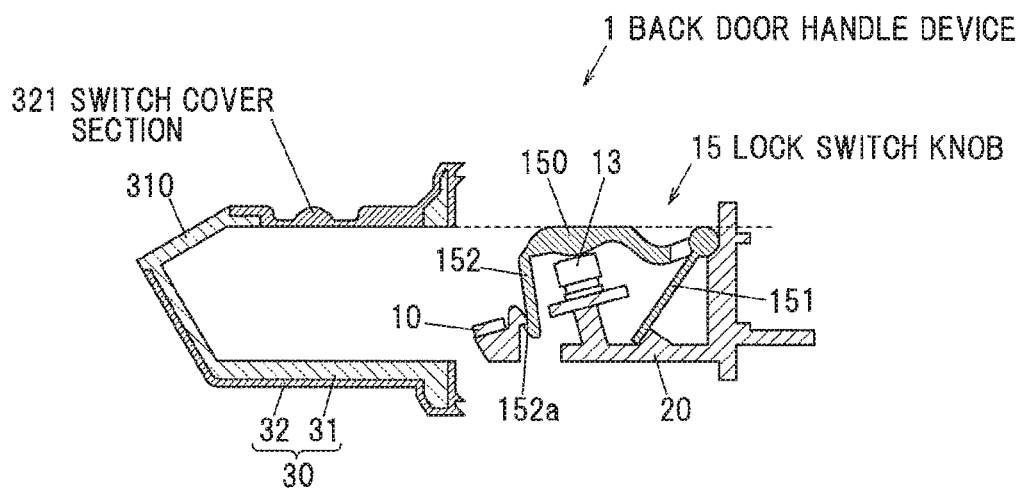
FIG. 9A shows the back door handle device according to the embodiment immediately before assembling the housing to the outer cover.
Figure 9B:
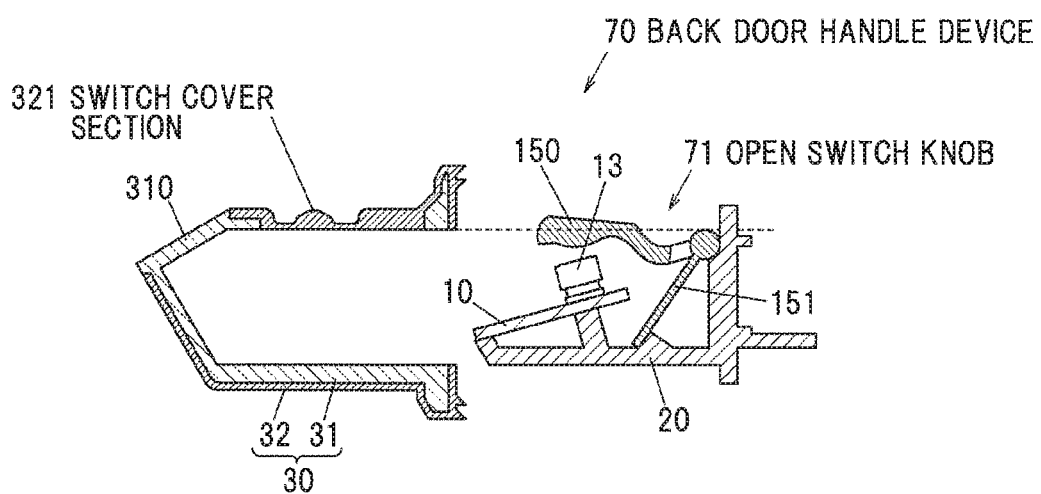
FIG. 9B shows a back door handle device according to a comparative example immediately before assembling a housing to an outer cover.

FIG. 9A shows the back door handle device 1 immediately before assembling the housing 20 to the outer cover 30, and FIG. 9B shows a back door handle device 70 according to a comparative example immediately before assembling the housing 20 to the outer cover 30.

The back door handle device 70 differs from the back door handle device 1 in that it has an open switch knob having no portion corresponding to the temporary fixing portion 142, and a lock switch knob 71 having no portion corresponding to the temporary fixing portion 152.

FIG. 9A is a vertical cross-sectional view of the back door handle device 1 including a cross section of the temporary fixing portion 152 of the lock switch knob 15. The location of the cross section of the back door handle device 70 of FIG. 9B corresponds to the location of the cross section of the back door handle device 1 of FIG. 9A. Note that the cross section of the back door handle 1 including the cross section of the temporary fixing portion 142 of the open switch knob 14 is also the same as the cross section shown in FIG. 9A.

The temporary fixing portion 142 of the open switch knob 14 fixes the open switch knob 14 so that the open switch knob 14 is not moved within the housing 20 when the housing 20 is assembled to the outer cover 30. This makes it possible to prevent the positional misalignment of the open switch knob 14 before assembling, or the disruption of assembling due to contact of the open switch knob 14 with the outer cover 30 during assembling. Note that the open switch knob 14 may be brought into contact with the outer cover 30 at the time of assembling, as long as the assembling is not disrupted.

Specifically, the temporary fixing portion 142 prevents such a movement of the open switch knob 14 as to move the operating portion 140 from the initial position to the opposite side to the switch position. On the other hand, since the open switch knob 14 has the spring section 141, there occurs almost no such movement of the open switch knob 14 as to move the operating portion 140 from the initial position to the switch position side, unless an external force is applied. In addition, movements of the open switch knob 14 in the width direction (W direction) and the length direction (L direction) of the back door handle device 1 are also prevented by the temporary fixing portion 142. For this reason, the open switch knob 14 is fixed within the housing 20 until the housing 20 is assembled to the outer cover 30.

On the other hand, in the back door handle device 70, since the open switch knob has no portion corresponding to the temporary fixing portion 142, it is not fixed within the housing 20. This results in such location of the open switch knob as to be in contact with the outer cover 30 at the time of assembling. In addition, since the open switch knob is not fixed within the housing 20, the positional misalignment of the open switch knob is highly likely to occur.

The temporary fixing portion 142 of the open switch knob 14 does not disrupt the operation of the open switch knob 14 after the housing 20 is assembled to the outer cover 30. That is, it does not disrupt the movement of the operating portion 140 between the initial position and the switch position.

The temporary fixing portion 142 is configured as a rod-like member having a claw 142a at its tip in the example shown in FIG. 3. Further, the temporary fixing portion 142 is temporarily fixed to the housing 20 or the substrate 10. For example, the tip of the temporary fixing portion 142 is passed through a hole 100 of the substrate 10 fixed to the housing 20, and the claw 142a is hooked on the protrusion of the housing 20 or the surface of the back side of the substrate 10 (the surface not opposed to the operating portion 140), so that the open switch knob 14 is temporarily fixed within the housing 20. In the example shown in FIG. 3, the temporary fixing portion 142 is temporarily fixed to the substrate 10.

The open switch knob 14 is preferably temporarily fixed with the temporary fixing portion 142 with the spring section 141 being elastically deformed to some extent, that is, with the spring section 141 being pressed against the inner surface of the housing 20. In this case, for example, in the step of assembling the housing 20 to the outer cover 30, since the open switch knob 14 is temporarily fixed within the housing 20 with an elastic force being produced in the spring section 141, the positional misalignment of the open switch knob 14 can be suppressed more effectively. Note that in this case, including when the operating portion 140 is in the initial position, the elastic force is always being produced in the spring section 141.

As shown in FIG. 9A, the temporary fixing portion 152 of the lock switch knob 15 fixes the lock switch knob 15 so that the lock switch knob 15 is not moved within the housing 20 when the housing 20 is assembled to the outer cover 30. This makes it possible to prevent the positional misalignment of the lock switch knob 15 before assembling, or the disruption of assembling due to contact of the lock switch knob 15 with the outer cover 30 during assembling.

Specifically, the temporary fixing portion 152 prevents such a movement of the lock switch knob 15 as to move the operating portion 150 from the initial position to the opposite side to the switch position. On the other hand, since the lock switch knob 15 has the spring section 151, there occurs almost no such movement of the lock switch knob 15 as to move the operating portion 150 from the initial position to the switch position side, unless an external force is applied. Further, movements of the lock switch knob 15 in the width direction (W direction) and the length direction (L direction) of the back door handle device 1 are also prevented by the temporary fixing portion 152. For this reason, the lock switch knob 15 is fixed within the housing 20 until the housing 20 is assembled to the outer cover 30.

On the other hand, in the back door handle device 70, since the lock switch knob 71 has no portion corresponding to the temporary fixing portion 152, it is not fixed within the housing 20. This results in such location of the lock switch knob 71 as to be in contact with the outer cover 30 at the time of assembling as shown in FIG. 9B. In addition, since the lock switch knob 71 is not fixed within the housing 20, the positional misalignment of the lock switch knob 71 is highly likely to occur.

The temporary fixing portion 152 of the lock switch knob 15 does not disrupt the operation of the lock switch knob 15 after the housing 20 is assembled to the outer cover 30, as shown in FIG. 8. That is, it does not disrupt the movement of the operating portion 150 between the initial position and the switch position.

The temporary fixing portion 152 is configured as a rod-like member having a claw 152a at its tip in the example shown in FIG. 3, FIG. 8 and FIG. 9. Further, the temporary fixing portion 152 is temporarily fixed to the housing 20 or the substrate 10. The tip of the temporary fixing portion 152 is passed through a hole 101 of the substrate 10 fixed to the housing 20, and the claw 152a is hooked on the protrusion of the housing 20 or the surface on the back side of the substrate 10 (the surface not opposed to the operating portion 150), so that the switch knob 15 is temporarily fixed within the housing 20. In the example shown in FIG. 3, the temporary fixing portion 152 is temporarily fixed to the substrate 10, and in the example shown in FIGS. 8 and 9, the temporary fixing portion 152 is fixed to the housing 20.

The lock switch knob 15 is preferably temporarily fixed with the temporary fixing portion 152 with the spring section 151 being elastically deformed to some extent, that is, with the spring section 151 being pressed against the inner surface of the housing 20. In this case, for example, in the step of assembling the housing 20 to the outer cover 30, since the lock switch knob 15 is temporarily fixed within the housing 20 with an elastic force being produced in the spring section 151, the positional misalignment of the lock switch knob 15 can be suppressed more effectively. Note that in this case, including when the operating portion 150 is in the initial position, the elastic force is always being produced in the spring section 151.

As shown in FIG. 3, it is preferable that the housing 20 has ribs 22 for abutting on the second surface 140b of the open switch knob 14 (the surface facing the open switch 12 side of the operating portion 140) and the second surface 150b of the lock switch knob 15 (the surface facing the lock switch 13 side of the operating portion 150). The ribs 22 are extended from the inner surface of the housing opposed to the second surface 140b and the second surface 150b through holes 102 of the substrate 10 toward the second surface 140b and the second surface 150b respectively.

In the case where the housing 20 has the ribs 22, the second surface 140b or the second surface 150b is in contact with the tips of the ribs 22 or is slightly separate from the ribs 22 when the operating portion 140 or the operating portion 150 reaches the switch position. For this reason, even when the operator pushes the open switch knob 14 or the lock switch knob 15 with an excessive force, the second surface 140b or the second surface 150b abuts on the tips of the ribs 22 thereby making it possible to suppress damage to the open switch knob 14 or the lock switch knob 15 due to excessive deformation.

Note that the number of ribs 22 is not particularly limited, but it is possible to separately provide ribs 22 for abutting on the second surface 140b of the open switch knob 14 and ribs 22 for abutting on the second surface 150b of the lock switch knob 15. Moreover, in order to more effectively suppress damage to the open switch knob 14 or the lock switch knob 15, it is preferable to provide a plurality of ribs 22 which abut on both ends in the vehicle width direction of the second surface 140b or the second surface 150b, or both ends and the middle in the vehicle width direction thereof.

Further, as shown in FIGS. 3 and 7, it is preferable that the housing 20 has a rib 23 for abutting on an inner surface of the lens section 310. The rib 23 is extended from the inner surface of the housing opposed to the inner surface of the lens section 310 through a hole 103 of the substrate 10, and its tip is in contact with the inner surface of the lens section 310. In the case where the housing 20 has the rib 23, since the lens section 310 is supported by the rib 23 from the inner side, it is possible to suppress damage to the lens section 310 when the operator accidentally applies a strong force to the lens section 310.

In the back door handle device 1, since the transparent portion 31 serves as both the resin portion and the lens of the outer cover, the lens is highly resistant to external force, as compared to the case where the resin portion of the outer cover and the lens separately provided are joined together. By providing the rib 23 there, it is possible to further enhance the resistance of the lens to external force.

As shown in FIG. 7, the ribs 22 and the rib 23 are passed through the substrate 10 and also act as positioning members for the substrate 10. In this manner, by allowing the ribs 22 and the rib 23 to have the two functions, it is possible to reduce the number of through holes provided in the substrate 10, and suppress a lowering in the thermal conductivity of the substrate 10.

Advantageous Effects of the Embodiments

In the back door handle device 1 of the above embodiment, the transparent portion 31 of the outer cover 30 serves as the resin portion and the lens of the outer cover, and the transparent portion 31 and the elastic portion 32 can integrally be formed by insert molding or the like. This makes it possible to reduce the number of parts of the back door handle device 1 and the number of manufacturing steps therefor, and thereby achieve a lowering in manufacturing cost and a reduction in size.

Although the embodiments of the present invention have been described above, this invention is not limited to the above-described embodiments, but various modifications can be implemented without deviating from the spirit of the invention. For example, in the above embodiments, the back door handle device 1 includes both the open switch 12 and the lock switch 13, but only one of them may be included in the back door handle device 1, while the other thereof may be installed outside of the back door handle device 1.

Further, the embodiments described above are not to be construed as limiting the inventions according to the claims. It should also be noted that not all combinations of the features described in the embodiments are indispensable to the means for solving the problem of the invention.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

DESCRIPTIONS OF THE REFERENCE CHARACTERS

1 Back door handle device
10 Substrate
11 Light emitting element
12 Open switch
13 Lock switch
14 Open switch knob
140 Operating portion
141 Spring section
142 Temporary fixing part
15 Lock switch knob
150 Operating portion
151 Spring section
152 Temporary fixing part
20 Housing
30 Outer cover
31 Transparent portion
310 Lens section
32 Elastic portion
320, 321 Switch cover section
33 Attaching part
34 Attaching hole
35 Metal collar
50 Back door
51 License plate
52 Back door garnish

What is claimed is:

1. A back door handle device, comprising:
a housing for accommodating a switch and a switch knob; and
an outer cover that covers an exterior of the housing,
wherein the switch knob includes a temporary fixing portion that prevents a movement of the switch knob; and
wherein the switch knob is held at an initial position, at least when the housing is assembled with the outer cover.

2. The back door handle device according to claim 1, wherein the back door handle device, is installed on a back door of a vehicle and which has a handle switch function for unlocking or locking the back door, wherein:
the switch is to output a signal for unlocking or locking the back door;
the switch knob is to supplement an actuating force of the switch;
the housing is for receiving the switch and the switch knob; and
the outer cover covers an exterior of the housing,
wherein the switch knob includes:
an operating portion that is moved from the initial position to a switch position by a force being applied by an operator;
a spring section that, when the operating portion is moved from the initial position toward the switch position, is elastically deformed to produce an elastic force in such a direction as to return the operating portion to the initial position;
wherein the temporary fixing portion prevents the movement of the switch knob that the operating portion is moved from a first side including the initial position to an opposite side including the switch position; and
wherein the signal is output from the switch when the operating portion reaches the switch position.

3. The back door handle device according to claim 2, wherein when the operating portion is in the initial position, the elastic force is produced in the spring section.

4. The back door handle device according to claim 2, wherein the temporary fixing portion is configured as a rod-like member having a claw at its tip, so that such a movement of the switch knob that the operating portion is moved from the initial position to the opposite side including the switch position is prevented by hooking the claw on the housing or a substrate mounted with the switch thereon.

5. A method for manufacturing a back door handle device which is installed on a back door of a vehicle and which has a handle switch function for unlocking or locking the back door, the method including assembling a housing for accommodating a switch to output a signal for unlocking or locking the back door and a switch knob to supplement an actuating force of the switch to an outer cover which covers an exterior of the housing,
wherein the switch knob includes:
an operating portion that is moved from an initial position to a switch position by a force being applied by an operator to operate the switch to output the signal;
a spring section that, when the operating portion is moved from the initial position toward the switch position, is elastically deformed to produce an elastic force in such a direction as to return the operating portion to the initial position; and
a temporary fixing portion that prevents the movement of the switch knob that the operating portion is moved from a first side including the initial position to an opposite side including the switch position, wherein the assembling includes temporarily fixing the switch knob within the housing with the temporary fixing portion, to thereby prevent positional misalignment of the switch knob and disruption of the assembling due to contact of the switch knob with the outer cover.

6. The method according to claim 5, wherein, in the assembling step, the switch knob is temporarily fixed within the housing with the elastic force being produced in the spring section.

7. The method according to claim 5, wherein the temporary fixing portion is configured as a rod-like member having a claw at its tip, so that such a movement of the switch knob that the operating portion is moved from the initial position to the opposite side including the switch position is prevented by hooking the claw on the housing or a substrate mounted with the switch thereon.

8. The back door handle device according to claim 3, wherein the temporary fixing portion is configured as a rod-like member having a claw at its tip, so that such a movement of the switch knob that the operating portion is moved from the initial position to the opposite side the switch position is prevented by hooking the claw on the housing or a substrate mounted. with the switch thereon.

9. The method according to claim 6, wherein the temporary fixing portion is configured as a rod-like member having a claw at its tip, so that such a movement of the switch knob that the operating portion is moved from the initial position to the opposite side including the switch position is prevented by hooking the claw on the housing or a substrate mounted with the switch thereon.

10. The back door handle device according to claim 1, wherein the temporary fixing portion prevents movement of the switch knob in a first direction and a second direction.

11. A back door handle device, comprising:
a housing for accommodating a switch and a switch knob; and
an outer cover that covers an exterior of the housing;
wherein the switch knob includes a temporary fixing portion, and
wherein the temporary fixing portion fixes the switch knob so that the switch knob is fixed at a first position within the housing when the housing is assembled to the outer cover.

12. The back door handle device according to claim 11, wherein the back door handle device, is installed on a back door of a vehicle and which has a handle switch function for unlocking or locking the back door,
wherein the switch knob includes:
an operating portion that is moved from the first position to a switch position by a. force being applied by an operator;

a spring section that, when the operating portion is moved from the first position toward the switch position, is elastically deformed to produce an elastic force in such a direction as to return the operating portion to the first position;
wherein the temporary fixing portion prevents such a movement of the switch knob that the operating portion is moved from the first position to the to the switch position; and
wherein the signal is output from the switch when the operating portion reaches the switch position.

13. The back door handle device according to claim 12, wherein:
the switch is to output a signal for unlocking or locking the back door;
the switch hob is to supplement an actuating force of the switch;
the housing is for receiving the switch and the switch knob; and
the outer cover covers an exterior of the housing.

14. The back door handle device according to claim 12, wherein the temporary fixing portion prevents such a movement of the switch knob that the operating portion is moved from the first position to an opposite side of the first position.

15. The back door handle device according to claim 12, wherein the switch knob is held at an initial position, at least when the housing is assembled with the outer cover, and
wherein the temporary fixing portion prevents such a movement of the switch knob that the operating portion is moved from the initial position to an opposite side of the initial position.

16. The back door handle device according to claim 12, wherein when the operating portion is in the first position, the elastic force is produced in the spring section.

17. The back door handle device according to claim 12, wherein the temporary fixing portion includes a rod-like member having a claw at a tip, so that such a movement of the switch knob that the operating portion is moved from the first position to the opposite side including the switch position is prevented by hooking the claw on the housing.

18. The back door handle device according to claim 12, wherein the temporary fixing portion prevents movement of the switch knob in a first direction and a second direction.

19. The back door handle device according to claim 16, wherein the temporary fixing portion includes a rod-like member having a claw at a tip, so that such a movement of the switch knob that the operating portion is moved from the first position to the opposite side including the switch position is prevented by hooking the claw on the housing.

* * * * *